United States Patent [19]
Lin

[11] Patent Number: 5,341,244
[45] Date of Patent: Aug. 23, 1994

[54] ZOOM LENS SYSTEM

[75] Inventor: Chieh-Yu Lin, Chung-Ho, Taiwan

[73] Assignee: Industrial Technology Research Institute, Hsinchu, Taiwan

[21] Appl. No.: 940,973

[22] Filed: Sep. 4, 1992

[51] Int. Cl.⁵ .............................. G02B 15/14
[52] U.S. Cl. ..................... 359/692; 359/714
[58] Field of Search ................. 359/692, 714

[56] References Cited

U.S. PATENT DOCUMENTS

| | | | |
|---|---|---|---|
| 4,772,106 | 9/1988 | Ogata et al. | 359/692 |
| 4,818,081 | 4/1989 | Ito | 359/692 |
| 5,168,403 | 12/1992 | Umeda et al. | 359/692 |

Primary Examiner—Edward K. Look
Assistant Examiner—F. Daniel Lopez
Attorney, Agent, or Firm—W. Wayne Liauh

[57] ABSTRACT

A zoom lens system consists of five lens elements arranged in two groups, in which the first three elements form a front lens group with positive refracting power and the last two elements form a rear lens group with negative refracting power. In the lens system of the present invention, the front lens group is composed of a positive first lens element, a negative second lens element, and a positive third lens element; the rear lens group consists of a positive fourth lens element and a negative fifth negative lens element. The airspace between the front lens group and the rear lens group is variable for zooming operation. Both the front lens group and rear lens group comprise at least an aspheric lens elements.

3 Claims, 7 Drawing Sheets

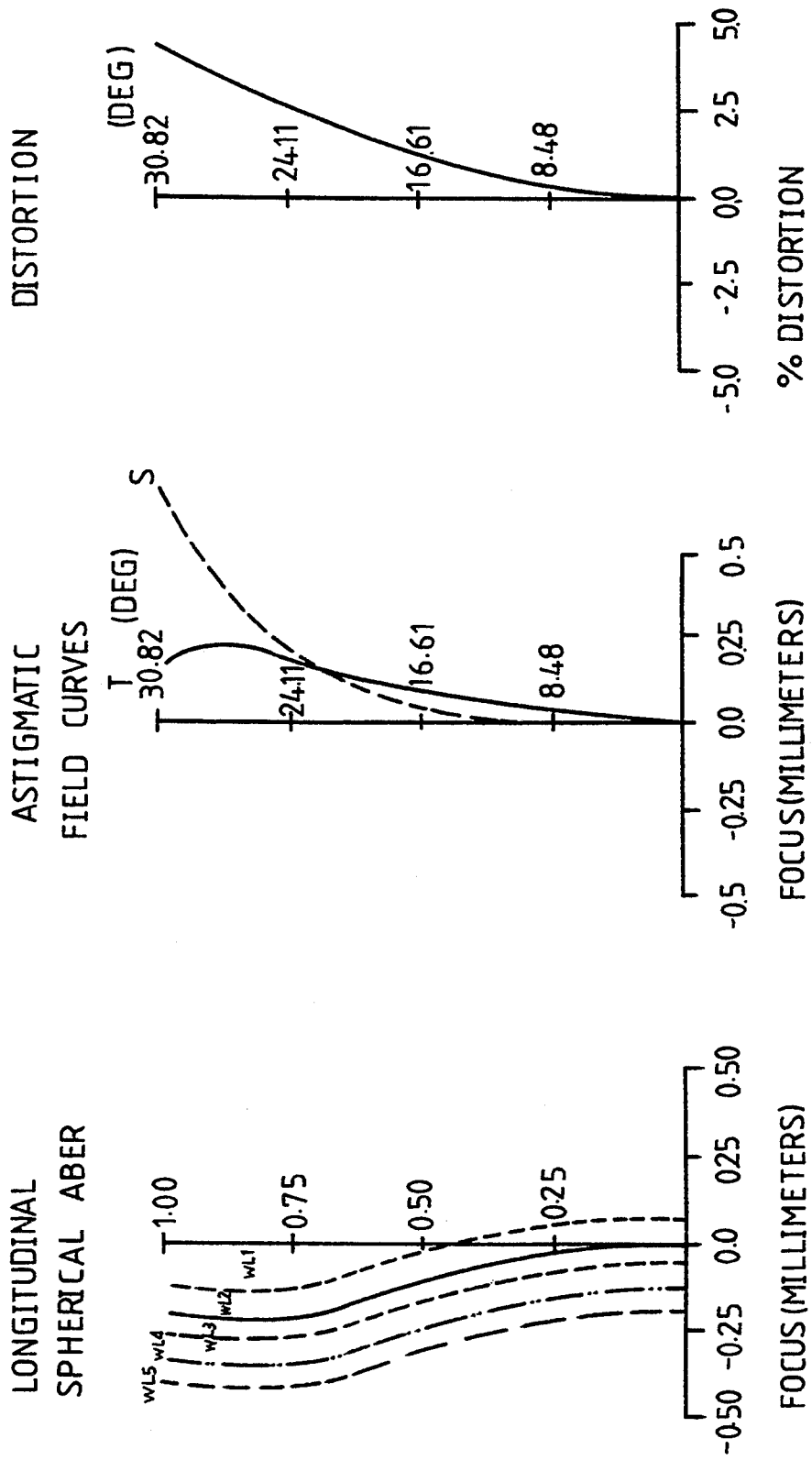

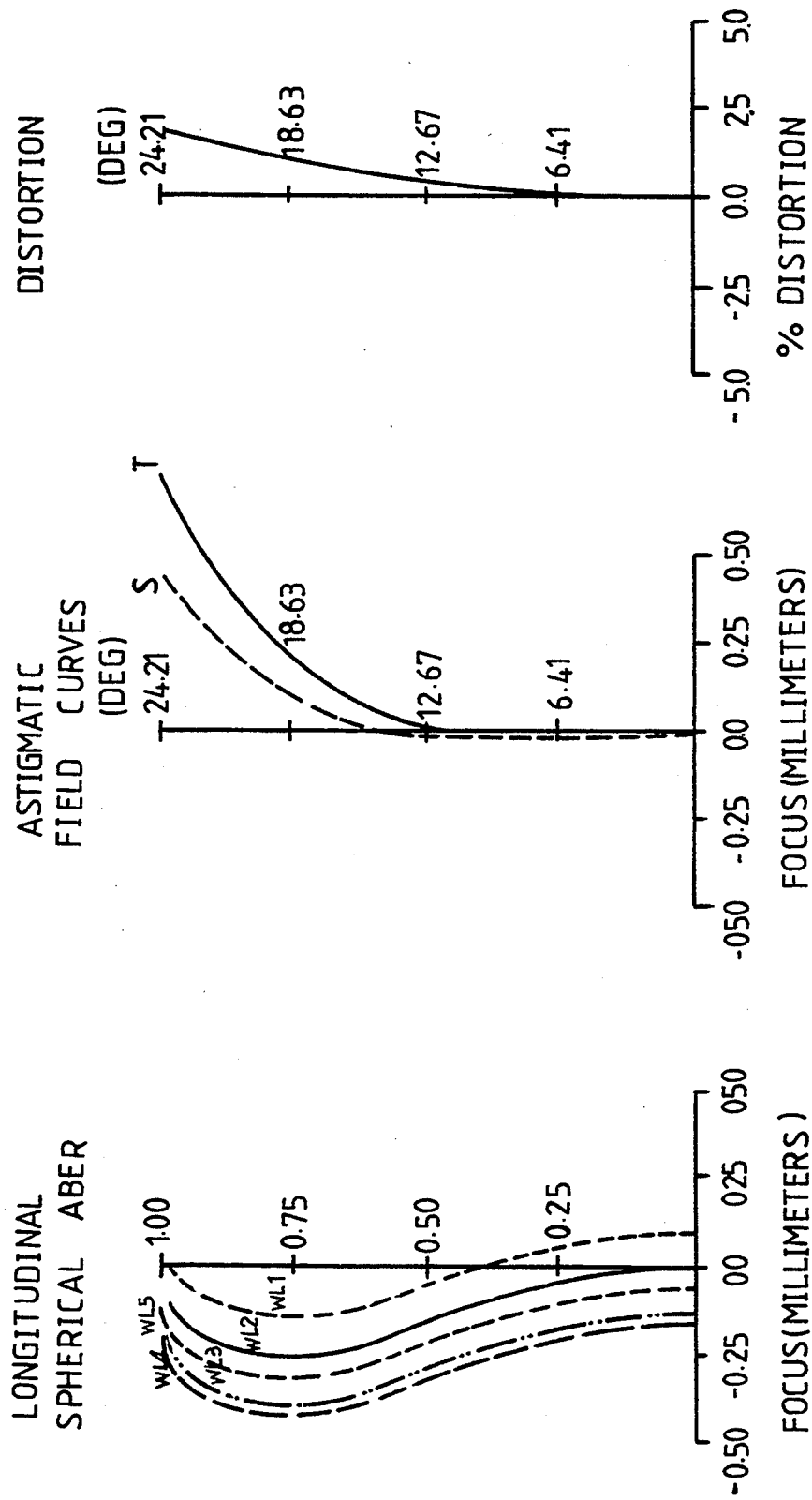

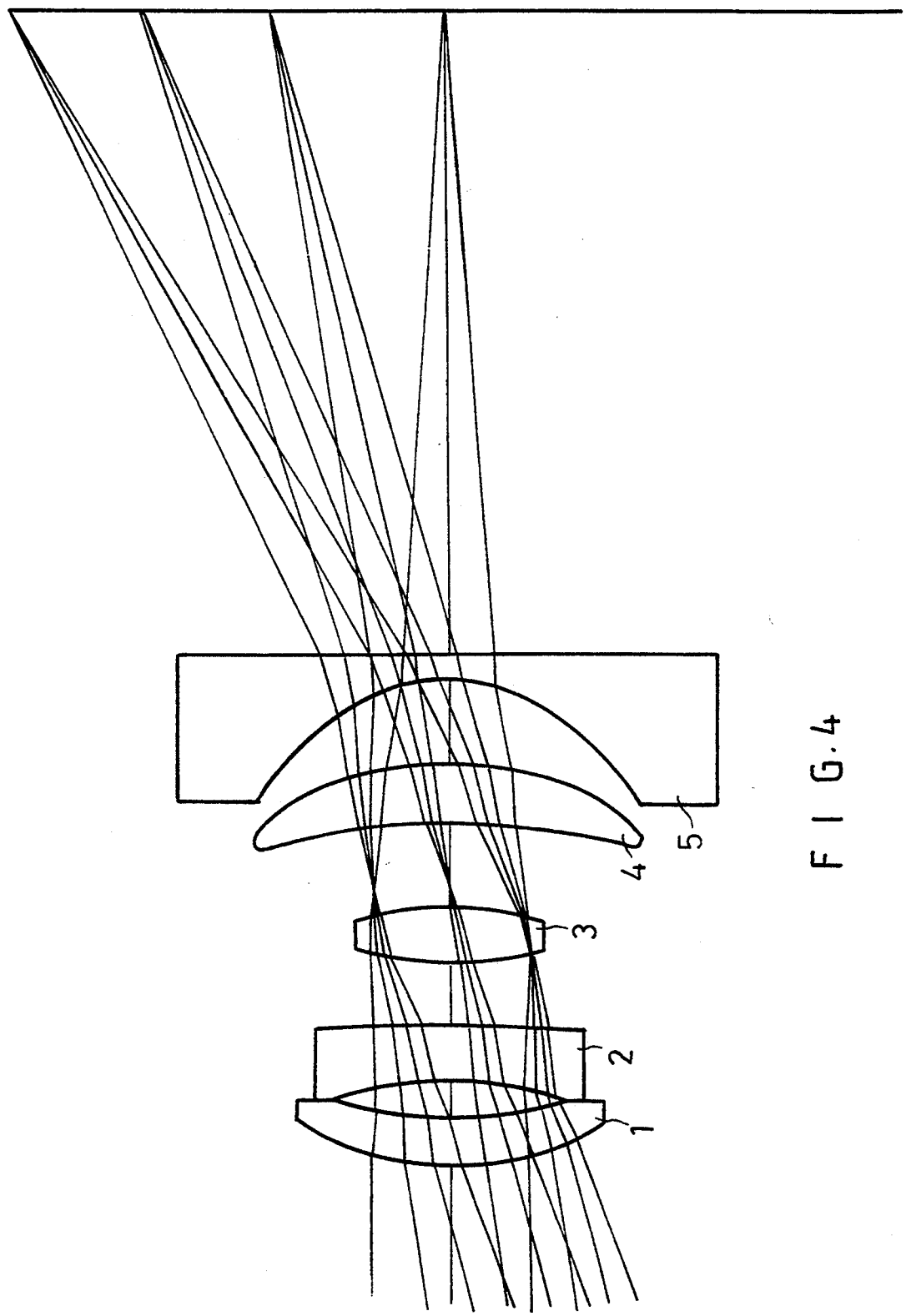

5,341,244

ZOOM LENS SYSTEM

BACKGROUND OF THE INVENTION

The present invention relates to a zoom lens system, and more particularly to a miniature zoom lens system comprising only five lens elements. The zoom lens system of the present invention is particularly suited for use with lens shutter cameras and provide the several advantages of short total length and small outside diameter.

Zoom lens systems have been widely used in cameras nowadays because it is capable of conveniently zooming the focal length of an easy lens system to facilitate the use of the camera. Generally, the zoom lens systems fall into two types. The first type belongs retro-focus lens system, which typically comprises a front lens group having a negative refractive power and a rear lens group having a positive refractive power. An airspace is reserved between the front lens group and the rear lens group, and it is possible to effectuate variation of focal length of the lens system by varying the airspace. Such a zoom lens system has the advantage in that it allows an ample space to be reserved for arranging a mirror. Consequently, the first type of zoom lens system is suitable for use in the well-known single lens reflex camera. However, it has disadvantages in that the front lens group of such a lens system has a large diameter and long total length. These disadvantages make it impossible to make the zoom lens system compact.

The second type of zoom lens system is the so-called telephoto system, which comprises a front lens group having a positive refractive power and a rear lens group having a negative refractive power. An airspace is similarly provided between the front lens group and the rear lens group for zooming. This type of zoom lens system is characterized in that it has a shorter back focal length and therefore allows the total length of the zoom lens system to be shortened, so that it is especially suitable for use in lens shutter cameras.

In the prior art, it is known that the total length of the zoom lens systems may be shortened by reducing the radii of the curvature of the lens elements. However, it will cause large aberrations during zooming. In the alternative, in order to limit the radii of the curvature of the lens elements and maintain the quality of lens, it may be necessary to employ more lens elements to form the lens systems. However, employing more lens elements it will increase the cost and the resultant cameras cannot be desirably light weight.

To overcome the problems mentioned above, various prior art compact zoom lens systems have been developed in this field. For example, U.S. Pat. No. 4,830,476 discloses a compact zoom lens system comprising four lens elements in the lens unit. The front lens group of the zoom lens system comprises a negative lens element, and a positive lens element and the rear lens group comprises a positive lens element and a negative lens element.

U.S. Pat. No. 4,838,669 discloses a zoom lens system with a front lens group having positive refractive power and a rear lens group having negative refractive power. The front lens group of the lens system comprises a positive meniscus lens, a negative lens and at least one positive lens, and the rear lens group of which consists of a positive lens, a biconcave lens and a negative meniscus lens.

U.S. Pat. No. 4,682,860 discloses a zoom lens system comprising a front lens groups having a positive refractive power and a rear lens group having a negative refractive power. The first lens group includes at least two positive lens elements and at least one negative lens element; the second lens group includes at least one positive lens element and at least one negative lens element. It is noted that the fourth embodiment as shown in FIGS. 9A and 9B of the '860 patent comprises five lens elements forming a zoom lens system. However, the lens system disclosed in the '860 patent contains lens elements with relatively steep radii of curvature and thus is relatively costly to manufacture.

U.S. Pat. No. 4,991,945 discloses a zoom lens comprising five lens elements. The first three elements form a positive lens group and the last two elements form a negative lens group. All of the lens elements in this prior patent are spherical and the optical condition/parameters such as radii of curvature of lens elements are different from the present invention.

SUMMARY OF THE INVENTION

The primary object of the present invention provides a compact zoom lens system which is suitable for use in lens-shutter camera. The zoom lens system in accordance with the present invention consists of only five lens elements, in which the first three elements form a positive front lens group and the last two elements form a negative rear lens group. An airspace reserved between the front lens group and the rear lens group is made variable to effect zooming. Further, both the front lens group and the rear lens group comprise at least an aspherical lens elements therein to form a new zoom lens system with the characteristics of short total length and small outside diameter.

The other objects and features of the invention will become more apparent from the following description taken in connection with the accompanying drawings.

BRIEF DESCRIPTION OF THE DRAWINGS

FIG. 2A shows the various longitudinal spherical aberrations of the lens system of FIG. 2;

FIG. 2B shows the astigmatism and the field curvature of the lens system of FIG. 2;

FIG. 2C shows the distortion of the lens system of FIG. 2;

FIG. 3A shows the various longitudinal spherical aberrations of the lens system of FIG. 3;

FIG. 3B shows the astigmatism and the field curvature of the lens system of FIG. 3;

FIG. 3C shows the distortion of the lens system of FIG. 3;

FIG. 4 is a schematic view illustrating refraction of rays through the lens system of the present invention in telephoto position;

DETAILED DESCRIPTION OF THE INVENTION

Figure 1:
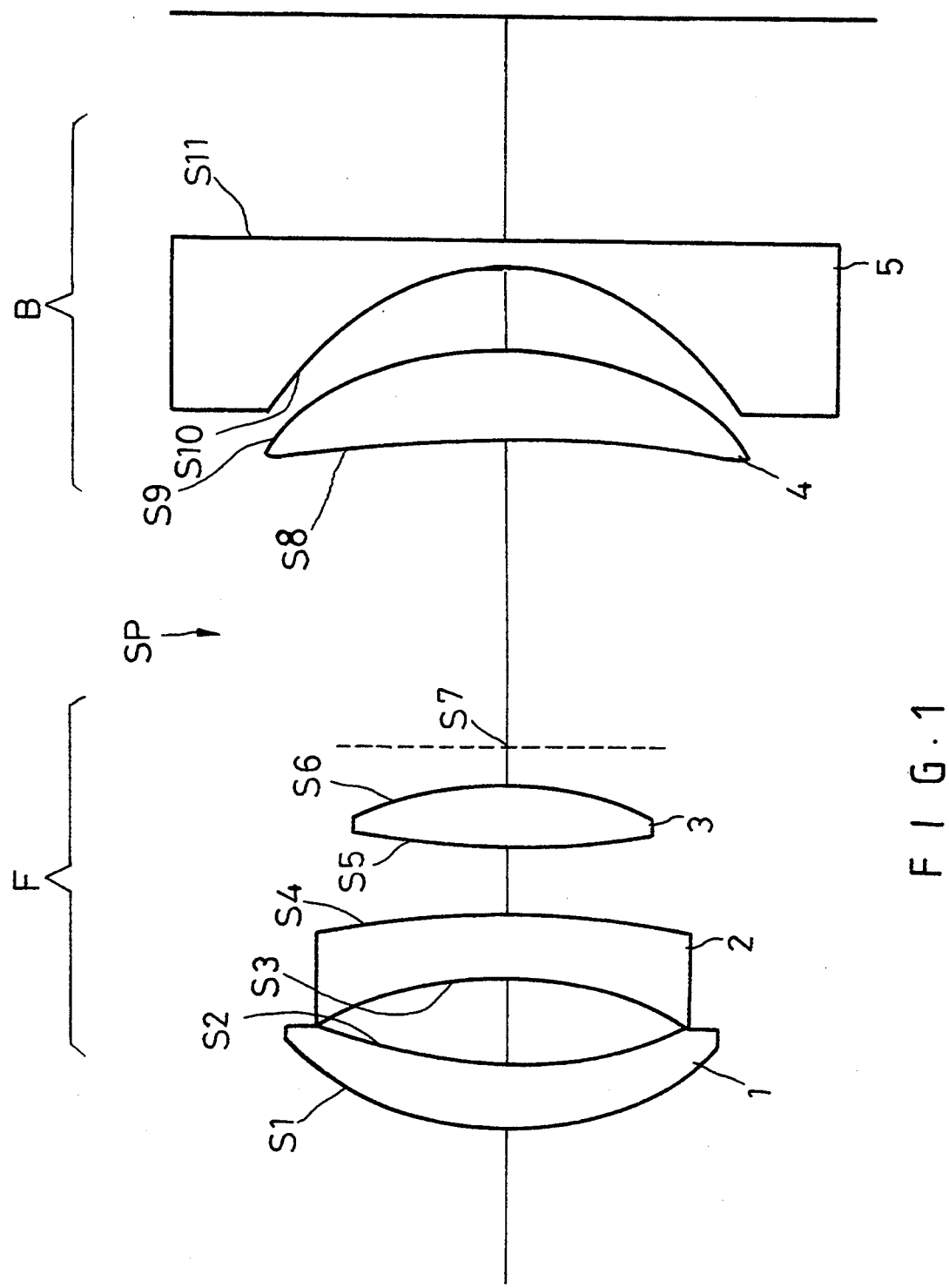
FIG. 1 shows a schematic view illustrating a zoom lens composition in accordance with the present invention.

Referring now to FIG. 1, it is shown a schematic view illustrating a zoom lens systems of the present invention consisting of five lens elements 1, 2, 3, 4, and 5. The five lens comprise the entire optical lens system of the present invention. In the order from the object side to the image side, the first three lens elements 1, 2, and 3 form a positive front lens group F and the last two lens elements 4 and 5 form a negative rear lens group B. An airspace SP is reserved between the front lens group F and the rear lens group B, and the airspace is made variable to effect zooming operation. The front lens group has a positive refractive power while the rear lens group has a negative refractive power.

Counting from the objective side to the image side along with the optical axis of the lens composition as shown in FIG. 1, the positive front lens group F consists of a positive lens element 1 whose convex surface is arranged toward the objective side of the lens system, a negative lens element 2, and a positive lens element 3. The negative rear lens group B consists of a positive lens element 4 whose convex surface is arranged toward the image side, and a negative lens element 5. In the lens composition of the present invention, both the front lens group and the rear lens group comprise at least one aspherical lens element respectively. In the preferred embodiment of the present invention, the third lens element 3 of the front lens group F is an aspherical lens, and the fourth lens element of the rear lens group is an aspherical lens, so that the aberration of the lens system may be reduced.

The feature of the aspheric lens may be indicated by the following equation:

$$Z = \frac{CY^2}{1 + [1 - (1 + k)C^2Y^2]^{\frac{1}{2}}} + A_4Y^4 + A_6Y^6 + A_8Y^8 + A_{10}Y^{10}$$

wherein

Z represents the sag of the lens;
C represents the curvature of the lens;
K is the conic coefficient;
Y represents the height of the lens from the optical axis of the lens system;
$A_4$ represents the 4th order deformation coefficient;
$A_6$ represents the 6th order deformation coefficient;
$A_8$ represents the 8th order deformation coefficient; and
$A_{10}$ represents the 10th order deformation coefficient.

The lens system of the present invention is designed to satisfy the following condition:

$1.0 < f_w/f_1 < 1.5$  (1)

$0 < f_b/f_w < 0.4$  (2)

wherein:

$f_w$ represents the focal length of the lens system in its widest position;
$f_1$ represents the focal length of the front lens group F;
$f_b$ represents the back focal length of the lens system in its widest position; and According to the two conditions (1) and (2) above, in case that the upper limit of the condition (1) is exceeded, it is possible to shorten the total length of the lens system but the aberration will be increased correspondingly. On the contrary, when that the lower limit of the condition (1) is exceeded, the lens system will be too long to be considered miniature.

If the lower limit of the condition (2) is breached, the diameter of the lens system will be too large. If the upper limit of the condition (2) is exceed, the diameter of the lens system may still be considered, but the total length of the lens will be relatively too long, and thereby disqualifying it to be considered a compact the lens system.

Figure 2:
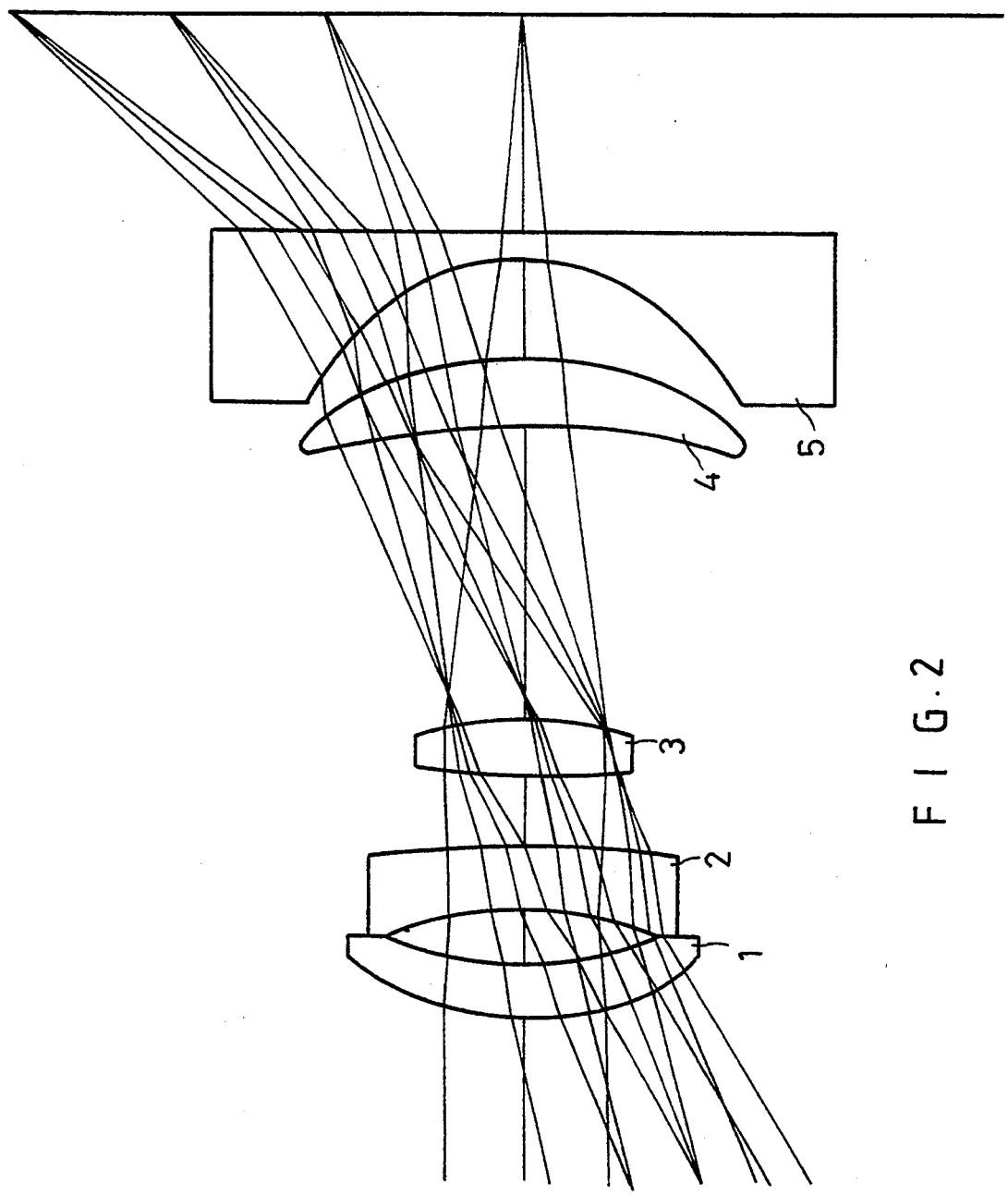
FIG. 2 is a schematic view illustrating refraction of rays through the lens system of the present invention in wide-angle position.

FIG. 2 is the lens layout in the wide-angle position. FIGS. 2A through 2C show the various aberrations of the lens system of FIG. 2 in the wide-angle position, FIG. 2A shows the longitudinal spherical aberrations of the lens system, FIG. 2B shows the astigmatism and the field curvature of the lens system, and FIG. 2C shows the distortion of the lens system.

Figure 3:
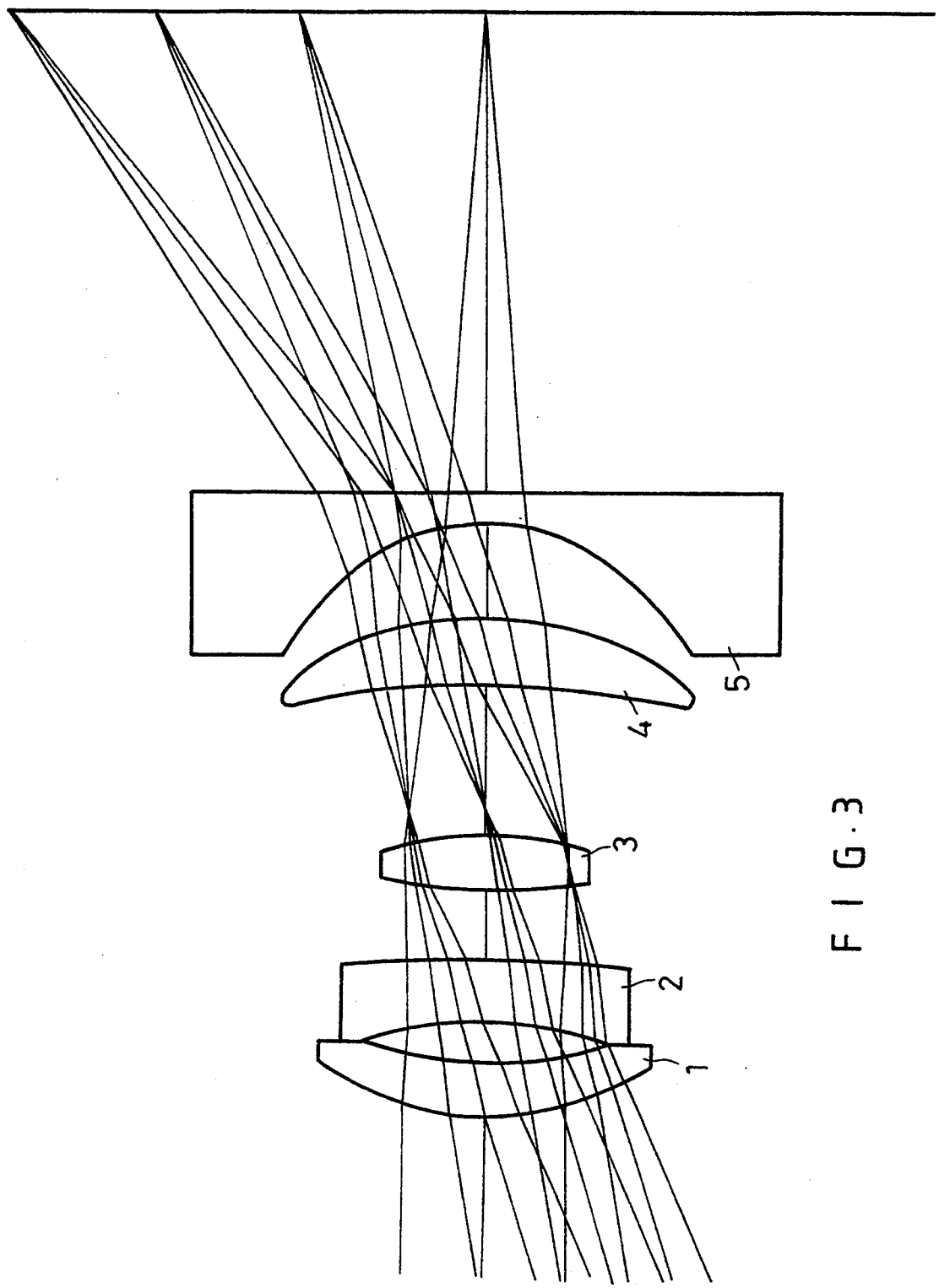
FIG. 3 is a schematic view illustrating refraction of rays through the lens system of the present invention at intermediate focal length.

FIG. 3 is the lens layout the intermediate focal length position. FIGS. 3A through 3C show the various aberrations of the lens system of FIG. 3 in intermediate focal length, FIG. 3A shows the longitudinal spherical aberrations of the lens system, FIG. 3B shows the astigmatism and the field curvature of the lens system, and FIG. 3C shows the distortion of the lens system.

Figures 4A, 4B, 4C:
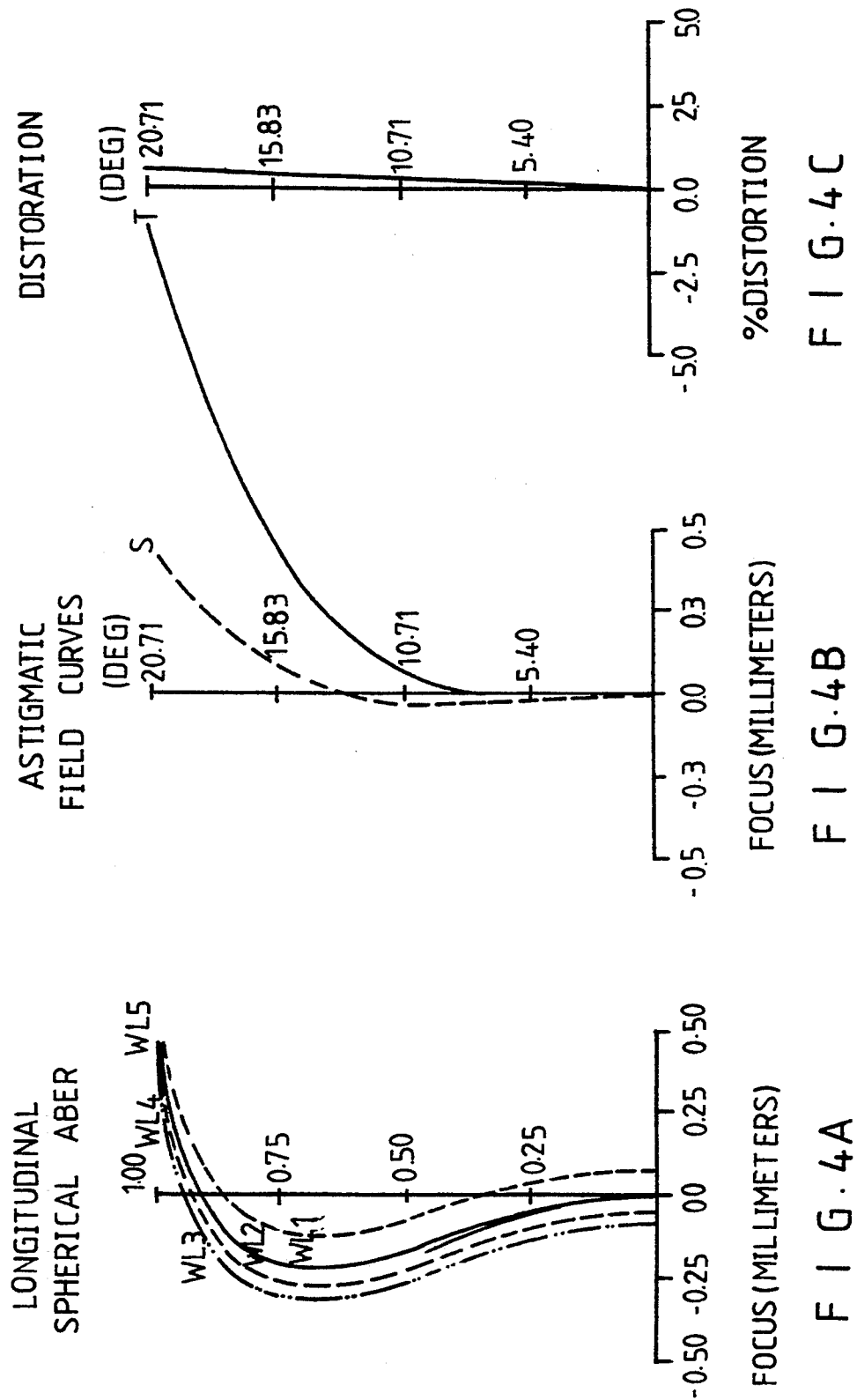
FIG. 4A shows the various longitudinal spherical aberrations of the lens system of FIG. 4.
FIG. 4B shows the astigmatism and the field curvature of the lens system of FIG. 4.
FIG. 4C shows the distortion of the lens system of FIG. 4.

FIG. 4 is the lens layout in the telephoto position. FIGS. 4A through 4C show the various aberrations of the lens system of FIG. 4 in the telephoto position, FIG. 4A shows the longitudinal spherical aberrations of the lens system, FIG. 4B shows the astigmatism and the field curvature of the lens system, and FIG. 4C shows the distortion of the lens system.

With reference to FIG. 1, the numerical data of a preferred embodiment of the zoom lens system in accordance with the present invention are listed as follows:

| surface numbers | R(mm) | d(mm) | N | V |
|---|---|---|---|---|
| S1 | 13.15452 | 2.533566 | 1.49917 | 57.1744 |
| S2 | 19.59117 | 1.927199 | | |
| S3 | −18.90817 | 2.8 | 1.75520 | 27.5 |
| S4 | −74.26841 | 3.146805 | | |
| S5 | 24.75615 | 2.584919 | 1.49917 | 57.1744 |
| S6 | −16.39341 | 1.0 | | |
| S7 | | 11.516030 | | |
| S8 | −39.89057 | 3.158262 | 1.49917 | 57.1744 |
| S9 | −18.20574 | 4.220644 | | |
| S10 | −10.25402 | 1.4 | 1.51823 | 59.0 |
| S11 | | | | |
| d7 11.51603-3.0505 | | | | |

| The aspheric coefficients of the surface No.5 | The aspheric coefficients of the surface No.9 |
|---|---|
| K = −3.421544 | K = 2.238320 |
| A4 = −0.486120E-4 | A4 = 0.734603E-5 |
| A6 = −0.117294E-5 | A6 = −0.230092E-6 |
| A8 = 0.502432E-7 | A8 = 0.286252E-8 |
| A10 = −0.189973E-8 | A10 = −0.592948E-11 | wherein the reference symbols

R represents the radii of curvature of respective lens surfaces;

N represents the refractive indices of respective lenses;

d represents the thickness of the respective lenses along optical axis; and

V represents the Abbe's number of respective lenses.

From the numerical data listed above, it is shown that the lens system of the present invention is a miniature zoom lens system with various focal length ranged from 35 mm to 60 mm and a zooming ratio of about 1.7.

So far, the feature of the present invention has been described. It will be obvious to those skilled in the art to use this invention according to the above detailed description. While the arrangement herein described constitutes a preferred embodiment of this invention, it is to be understood that various changes and modifications may be made therein without departing from the scope and spirit of the invention as defined in the appended claim.

What is claimed is:

1. A zoom lens system consisting of five lens elements arranged into two groups, the first three lens elements forming a front lens group with positive refracting power and the last two lens elements forming a rear lens group with negative refracting power, an airspace between two groups is made variable to effect zooming, counting from the objective side the front lens group consisting of a positive first lens element, a negative second lens element, and a positive third lens element, said rear lens group consisting of a positive fourth lens element and a negative fifth lens element, the zoom lens system being designed to satisfy the following condition:

$$1.0 < f_w/f_1 < 1.5$$

wherein $f_w$ represents the focal length of the lens system in widest position, $f_1$ represents the focal length of front lens group, the zoom lens system is further designed to satisfy the following condition:

$$0 < f_b/f_w < 0.4$$

wherein the $f_b$ represents the back focal length of the lens system in widest position, further wherein the front lens group consisting of two spherical lens elements and an aspheric lens element and the rear lens group consisting of a spherical lens element and an aspheric lens element.

2. A zoom lens system as claimed in claim 1, wherein the third lens element in the front lens group and the fourth lens element in the rear lens group are aspheric lens elements.

3. The zoom lens system as claimed in claim 2, wherein the object-side surface of the third lens element in the front lens group and the image-side surface of the fourth lens element in the rear lens group are aspheric surfaces.

* * * * *